United States Patent
Herbon (10) Patent No.: US 12,299,964 B2
(45) Date of Patent: May 13, 2025

(54) METHOD FOR GENERATING TRAINING DATA FOR A TRAINABLE METHOD

(71) Applicant: Robert Bosch GmbH, Stuttgart (DE)

(72) Inventor: Christopher Herbon, Weil im Schoenbuch (DE)

(73) Assignee: ROBERT BOSCH GMBH, Stuttgart (DE)

( * ) Notice: Subject to any disclaimer, the term of this patent is extended or adjusted under 35 U.S.C. 154(b) by 335 days.

(21) Appl. No.: 18/153,529

(22) Filed: Jan. 12, 2023

(65) Prior Publication Data

US 2023/0230360 A1 Jul. 20, 2023

(30) Foreign Application Priority Data

Jan. 18, 2022 (DE) .................... 10 2022 200 488.4
Sep. 9, 2022 (DE) .................... 10 2022 209 401.8

(51) Int. Cl.
| | | |
|---|---|---|
| *G06V 20/70* | (2022.01) | |
| *G06V 10/774* | (2022.01) | |
| *G06V 10/776* | (2022.01) | |
| *G06V 20/58* | (2022.01) | |

(52) U.S. Cl.
CPC .......... *G06V 10/774* (2022.01); *G06V 10/776* (2022.01); *G06V 20/58* (2022.01); *G06V 20/70* (2022.01)

(58) Field of Classification Search
CPC ...... G06V 20/58; G06V 20/70; G06V 10/774; G06V 10/776
See application file for complete search history.

(56) References Cited

U.S. PATENT DOCUMENTS

2016/0065288 A1* 3/2016 Yu .................. H04B 7/0413
375/267
2019/0354785 A1 11/2019 Samii et al.

FOREIGN PATENT DOCUMENTS

DE 102018214979 A1 3/2020

OTHER PUBLICATIONS

Qin, et al.: "Improving Semantic Segmentation via Label Propagation and Temporal Consistency," 2019 IEEE International Conference on Signal, Information and Data Processing (ICSIDP), (2019), pp. 1-5.

* cited by examiner

*Primary Examiner* — Sam Bhattacharya
(74) *Attorney, Agent, or Firm* — NORTON ROSE FULBRIGHT US LLP (57) ABSTRACT

A method for generating training data for a trainable method for a system including sensor(s) for detecting at least one subarea of the surroundings around the system. The method includes: a) obtaining first and second detections having at least one known relative ratio between the detections and/or the sensors that carried out the detections; b) determining a portion of the particular content of the detections, and assigning a piece of information concerning the determined content to the detection in question, c) projecting assigned piece of information from one of the detections and/or from a content representation associated with same into at least one other of the detections and/or into a content representation associated with the other detection, d) checking a subarea of at least one of the detections and/or of at least one of the content representations for possible inconsistencies in the detection content.

9 Claims, 4 Drawing Sheets

METHOD FOR GENERATING TRAINING DATA FOR A TRAINABLE METHOD

CROSS REFERENCE

The present application claims the benefit under 35 U.S.C. § 119 of German Patent Application Nos. DE 10 2022 200 488.4 filed on Jan. 18, 2022, and DE 10 2022 209 401.8 filed on Sep. 9, 2022, which are expressly incorporated herein by reference in their entireties.

FIELD

The present invention relates to a method for generating training data for a trainable method for a system including one or multiple sensors for detecting at least one subarea of the surroundings around the system. The present invention relates in particular to a method for generating training data, such as label data for a (machine-)trainable or learning method for mono- or multi-camera systems. Moreover, a computer program for carrying out the method, a machine-readable memory medium on which the computer program is stored, and a system, including one or multiple sensors, that is configured to carry out the method, are provided.

BACKGROUND INFORMATION

Annotation or labeling of images for learning methods generally takes place using one of the following methods: manual labeling; use of synthetically generated image data and label data; programmatic labeling based on additional information.

In the first case, images of humans are annotated pixel-wise or in some other granularity, and each pixel or each region obtains the specified label. This procedure requires a large expenditure of human labor. The generated labels are fairly accurate, but not perfect.

When synthetically generated data are used as in the second case, labels are typically a byproduct of the image data generation.

Here, each pixel or each region generally already obtains a label from the software that is used (from a renderer, for example). The advantage of this method is the high accuracy, although an enormous amount of (computing) time must be expended to create the most realistic appearance possible. This is extraordinarily complex, in particular taking into account interfering influences on actual image data. Possible examples of interfering influences include rolling shutter, motion blur, photon noise, light reflections, soiling, and the like.

During programmatic labeling, additional information, for example additional sensors or knowledge about the surroundings, may be utilized. In this way, it is possible to process more data and generate more labels than with manual annotation, while the input data correspond to the data that are to be realistically expected from genuine applications.

For the best possible results from learning methods in digital image processing, a large quantity of training data, i.e., annotated or labeled image data, is generally advantageous. Since manual labeling is costly and synthetic data are realistic only to a limited extent, it is advantageous to support the generation of training data with programmatic approaches.

Due to the increasingly popular crowd sourcing approaches, a large amount of data may be quickly accessed, but it is generally not annotated or labeled. To still be able to utilize these data as training data, it is appropriate to automatically generate labels based on previous knowledge in order to subsequently use the data, directly or after renewed checking, for training purposes.

This procedure is advantageous in particular for image contents that seldom occur, and for which it is advantageous to depict them from different perspectives and at different points in time.

SUMMARY

An object of the present invention is to reduce the effort for generating training data for trainable (image processing) methods.

The object may be achieved via the features of the present invention. Advantageous embodiments of the present invention are disclosed herein.

According to the present invention, a method contributes to generating training data for a trainable method for a system including one or multiple sensors for detecting at least one subarea of the surroundings around the system. In accordance with an example embodiment of the present invention, the method includes the following steps:

a) obtaining one first detection and at least one second detection having at least one known relative ratio between the detections and/or the sensors that have carried out the detections, b) determining at least a portion of the particular content of the detections, and assigning at least one piece of information concerning the determined content to the detection in question, c) projecting at least one assigned piece of information from one of the detections and/or from a content representation associated with same into at least one other of the detections and/or into a content representation associated with the other detection, d) checking at least one subarea of at least one of the detections and/or of at least one of the content representations for possible inconsistencies in the detection content.

Steps a), b), c), and d) may be carried out, for example, at least once and/or repeatedly in the stated order for carrying out the method. In addition, steps a), b), c), and d), in particular steps c) and d), may be carried out, at least in part, in parallel or concurrently.

The method advantageously contributes to allowing inconsistencies in the image content of multiple images of the same setting to be recognized. In particular, the method may contribute to allowing inconsistencies in the detection of at least one object in multiple detections of the same setting to be recognized. "Object" here is meant as an object in the conventional sense, for example another road user, as well as a pixel classification.

According to an example embodiment of the present invention, obtaining a first detection and at least one second detection having at least one known, in particular spatial and/or temporal, relative ratio, such as for example relative distance or relative orientation, between the detections and/or the sensors that have carried out the detections takes place in step a).

According to an example embodiment of the present invention, determining at least a portion of a particular content of the detections and assigning at least one piece of information concerning the determined content of the detection in question takes place in step b), for which purpose it is possible in particular to carry out an annotation and/or labeling and/or a classification of particular contents of the detections, and as the result of which an at least partial content representation of the detection in question may be generated. The detection of at least one object in the content of the detection in question may take place.

According to an example embodiment of the present invention, projecting at least one assigned piece of information, in particular at least one annotation and/or one label and/or one classification of one of the detections and/or of a content representation associated with same, into at least one other of the detections and/or into a content representation associated with the other detection takes place in step c), in particular taking into account the known relative ratio.

According to an example embodiment of the present invention, checking at least one subarea of at least one of the detections and/or of at least one of the content representations for possible inconsistencies in the detection content takes place in step d), in particular taking into account the projection from step c), in particular at least one subarea into which the projection took place or from which the projection took place being checked.

According to one advantageous embodiment of the present invention, it is provided that a (preferably automatic) extraction of at least one subarea of at least one of the detections and/or of one of the content representations takes place in particular in a step e) when an inconsistency in the detection content has been recognized in the subarea. The extraction is particularly advantageous for allowing the training data to be enhanced as quickly as possible and with comparatively little computing complexity.

According to a further advantageous embodiment of the present invention, it is provided that checking at least one subarea of at least one of the detections and/or of one of the content representations takes place in particular in a step e) or a step f) when an inconsistency in the detection content has been recognized in the subarea. The checking may preferably take place automatically or by machine.

A recognized inconsistency may have various causes:
false negative recognition: an actually existing object has been recognized in one perspective but not in another perspective.
false positive recognition: an object has been erroneously recognized in one (or multiple) perspectives, although no object is present.
concealment: an object is visible from only one perspective, and is concealed from another perspective.

According to a further advantageous embodiment of the present invention, it is provided that adapting at least one subarea of at least one of the detections and/or of one of the content representations takes place in particular in a step e) or a step f) or a step g) when an inconsistency in the detection content has been recognized in the subarea. Such an adaptation may particularly advantageously contribute to training the learning method.

According to a further advantageous embodiment of the present invention, it is provided that at least one piece of depth information concerning the spatial depth of at least one subarea of at least one of the detections and/or of at least one of the content representations is ascertained and taken into account in the projection, the depth information being ascertained in particular for at least one subarea into which the projection takes place or from which the projection takes place.

According to a further advantageous embodiment of the present invention, it is provided that the system includes multiple camera sensors that are arranged in the form of a camera belt. In this context, the system may be suitable for use in or at a vehicle, for example, and/or the camera belt may be situated in or at a vehicle. The vehicle may be a motor vehicle such as an automobile, for example. The vehicle may be configured for an at least semi-automated or autonomous driving operation.

According to a further advantageous embodiment of the present invention, it is provided that a temporal consistency check is carried out. At least three detections following one another in chronological succession may preferably be used for this purpose.

According to one advantageous embodiment of the present invention, a method for automatically generating label data in multicamera systems may be provided. One preferred application is the provision of data for training deep learning methods and related methods, for example classifiers.

Programmatic labeling may be carried out using the method. Knowledge about the location and orientation of the various cameras relative to one another may be utilized as additional information.

The generation of label data in video data may represent an important, and at the same time complex, step in learning image processing methods. In the method described herein, use may advantageously be made of the fact that labels in overlapping image details of a multicamera system should be consistent. If inconsistencies occur, the regions in question may be extracted in particular automatically and used, for example, as labels for the next training, such as in a neural network or the like. Optionally, the labels may also be enhanced or made more accurate by hand.

When a setting is viewed from various perspectives, a label may be advantageously projected from one image into another image from a different perspective. If an object, for example a vehicle or a pedestrian, is recognized in one image but not in a second image, the object may, for example, be projected from the first image into the second image, and in addition, for example the resulting image detail may be extracted in particular as a label.

The recognition of the object in the first image may take place, for example, using a deep learning method or some other arbitrary method, for example generic object recognition based on structure from motion, with the aid of a classifier, or using some other sensor (radar, LIDAR, ultrasound, etc.).

The terms "annotation/labeling" may be explained as follows: The image content may be classified pixelwise or regionwise, for example as a vehicle, pedestrian, roadway, lane marking, curb, building, or the like. An enveloping rectangle ("bounding box") is generally used for a regionwise annotation.

The term "trainable or learning method" may be explained as follows: This is a generic term for methods that use a large quantity of training data to adapt, in particular enhance, the parameters of a model or of an algorithm. This may be, for example, a neural network (deep learning), a classifier, or the like.

The term "semantic segmentation" may be explained as follows: In a pixelwise annotation, reference is made to a semantic segmentation in contrast to, for example, enveloping rectangles ("bounding box").

The term "ego-vehicle" may be explained as follows: The vehicle in which one or multiple cameras, which may be utilized for the described method, are installed.

In one advantageous embodiment of the present invention, a method may be provided, with the aid of which inconsistencies in the image content of multiple images of the same setting may be recognized.

"Object" may be understood here as an object in the conventional sense as well as a pixel classification.

In particular, the method may relate to an automatic generation of label data for learning methods in mono- or multi-camera systems.

According to a further aspect of the present invention, a computer program for carrying out a method presented here is provided. In other words, this relates in particular to a computer program (product) that includes commands which, when the program is executed by a computer, prompt the computer to carry out a method described herein.

According to a further aspect of the present invention, a machine-readable memory medium is provided on which the computer program presented here is saved or stored. The machine-readable memory medium is generally a computer-readable data medium.

According to a further aspect of the present invention, a system that includes one or multiple sensors is provided and is configured to carry out a method described herein. The system may be suitable, or provided and configured, for a vehicle. The system may include, for example, a computer and/or a control unit (controller) that may execute commands in order to carry out the method. For this purpose, the computer or the control unit may execute the provided computer program, for example. For example, the computer or the control unit may access the provided memory medium to allow the computer program to be executed.

The details, features, and advantageous embodiments discussed in conjunction with the method of the present invention may also correspondingly be present for the computer program and/or the memory medium and/or the system presented herein according to the present invention, and vice versa. In this regard, reference is made in full to the statements made there for characterization of the features in greater detail.

The approach presented herein as well as its technical environment is explained in greater detail below with reference to the figures. It is pointed out that the present invention is not to be restricted by the illustrated exemplary embodiments. In particular, unless explicitly stated otherwise, it is also possible to extract partial aspects of the actual situation shown in the figures and combine them with other components and/or findings from other figures and/or the present description.

DETAILED DESCRIPTION OF EXAMPLE EMBODIMENTS

Figure 1:
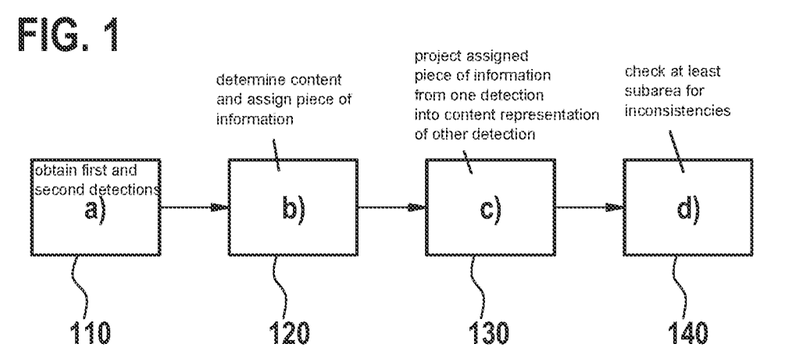
FIG. 1 schematically shows an example of a flowchart of the method presented herein, according to the present invention.

FIG. 1 schematically shows an example of a flowchart of the method presented herein. The method is used to generate training data for a trainable method for a system 1 including one or multiple sensors 2 for detecting at least one subarea 3 of the surroundings around system 1. The order of steps a), b), c), and d) depicted by blocks 110, 120, 130, and 140, respectively, is an example, and for carrying out the method may be run through, for example, at least once in the illustrated order.

According to step a), obtaining a first detection 4 and at least one second detection 5 having at least one known, in particular spatial and/or temporal, relative ratio, such as for example relative distance or relative orientation, between detections 4, 5 and/or sensors 2 that have carried out detections 4, 5 takes place in block 110.

According to step b), determining at least a portion of a particular content of detections 4, 5 and assigning at least one piece of information concerning the determined content of detection 4, 5 in question takes place in block 120, for which purpose it is possible in particular to carry out an annotation and/or a labeling and/or a classification of particular contents of detections 4, 5, and as the result of which an at least partial content representation of detection 4 and/or 5 in question may be generated.

Figure 4:
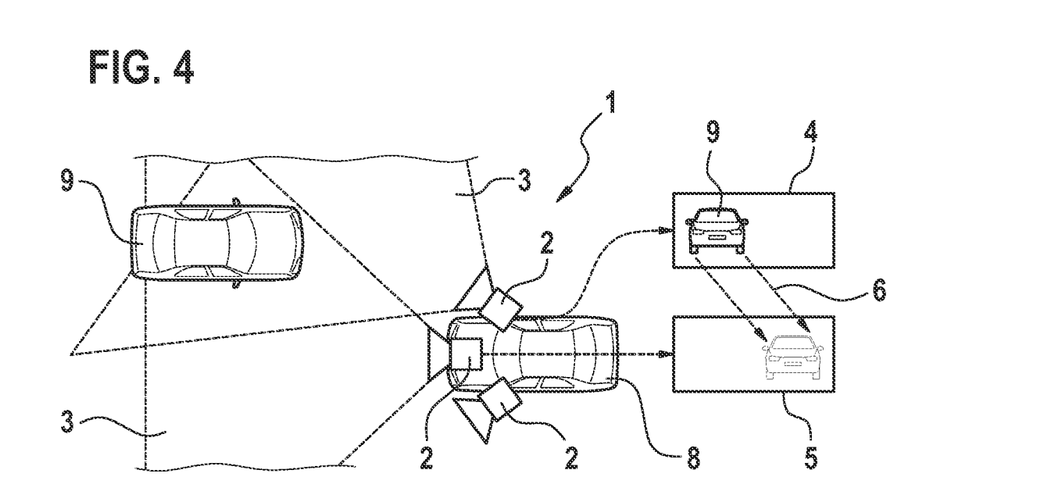
FIG. 4 schematically shows an example of one possible application of the method, using a system described herein, according to the present invention.
Figure 7:
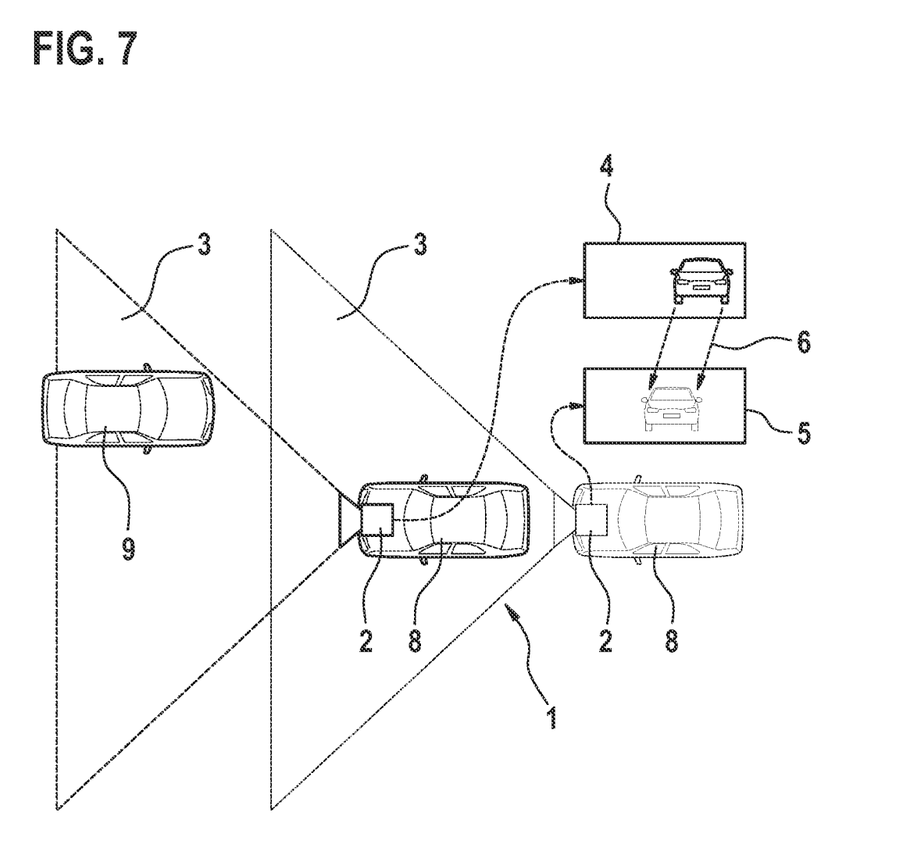
FIG. 7 schematically shows an example of a further possible application of the method, using a system described herein, according to the present invention.

This may contribute here, for example, to allowing an object 9, such as another vehicle or road user, and/or its position in the detection in question to be recognized as image content (cf. FIGS. 4, 7).

According to step c), projecting at least one assigned piece of information, in particular at least one annotation and/or one label and/or one classification, from one of detections 4 and/or from content representations associated with same into at least one other of detections 5 and/or into a content representation associated with other detection 5, in particular taking into account the known relative ratio, takes place in block 130.

According to step d), checking at least one subarea of at least one of detections 4, 5 and/or of at least one of the content representations for possible inconsistencies in the detection content takes place in block 140, in particular taking into account projection 6 from step c), in particular at least one subarea being checked into which projection 6 has taken place or from which projection 6 has taken place.

Figure 2:
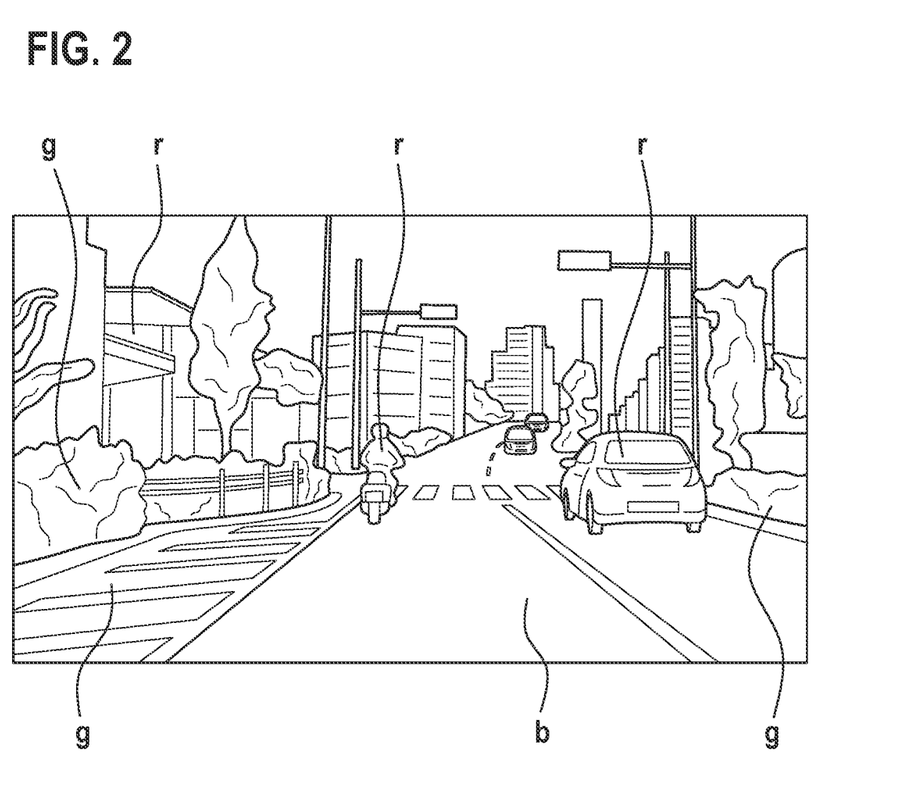
FIG. 2 schematically shows an example of an image with pixel annotation (labels) in color coding, according to the present invention.

FIG. 2 schematically shows an example of an image with pixel annotation (labels) in color coding. Color coding is represented here by denoting color-coded areas in each case (r=red, b=blue, or g=green). Arbitrary color codings that are more complex may be implemented. Such a pixel annotation may be used, for example, in the method described herein, in particular in step c).

In particular, the use in vehicles is considered in the following paragraphs. However, the method may be used for any type of moving or stationary device. These may be robots and flying objects, for example, although use in monitoring technology for buildings or in parking garages is also possible and meaningful.

Figure 3:
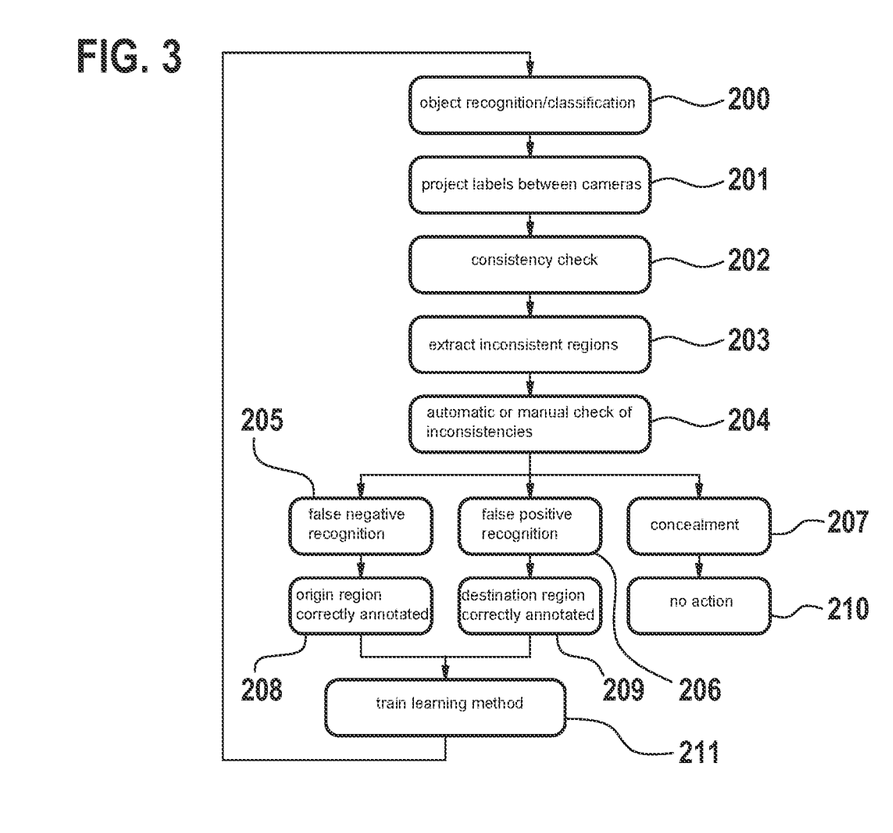
FIG. 3 schematically shows an example of a block diagram of one advantageous specific embodiment of the method described herein, according to the present invention.

The method may include a plurality of steps, for example, as illustrated in FIG. 3, for example.

FIG. 3 schematically shows an example of a block diagram of one advantageous specific embodiment of the method described herein.

As an example, an object recognition/classification takes place in block 200 with the aid of a learning method. An automatic pixelwise or objectwise classification of the image content may initially be carried out on multiple cameras that record the same setting, for example with the aid of a neural network or a classifier.

This represents an example of, and optionally how, obtaining a first detection 4 and at least one second detection 5 having at least one known relative ratio between detections 4, 5 and/or sensors 2 that have carried out detections 4, 5 may take place according to step a), on the basis of which determining at least a portion of the particular content of detections 4, 5 and assigning at least one piece of information concerning the determined content of detection 4, 5 in question may take place according to step b).

A projection of labels between cameras takes place by way of example in block 201. For example, via the known orientation of the cameras relative to one another (extrinsics/extrinsic calibration) and the mapping rule of each individual camera (intrinsics/intrinsic calibration), the labels of one image may be projected into another image. For a pixel-exact projection, in addition to intrinsics and extrinsics of the cameras, information concerning the depth or distance of each pixel from the camera is also advantageous.

This represents an example of, and optionally how, projecting at least one assigned piece of information from one of detections 4 and/or from a content representation associated with same into at least one other of detections 5 and/or into a content representation associated with other detection 5 may take place.

This (depth) information may be computed using various methods, for example structure from motion, disparity, or with the aid of additional sensors (radar, LIDAR, ultrasound). Alternatively, this information may also come directly from a neural network, either via a single-image estimation ("depth from mono") or a multi-image estimation.

Combining the label projection with data from a depth reconstruction could represent a further particularly advantageous specific embodiment. This is the case in particular when both pieces of information come from a neural network, but also when they are determined independently of one another.

This represents an example of, and optionally how, at least one piece of depth information concerning the spatial depth of at least one subarea of at least one of detections 4, 5 and/or of at least one of the content representations may be ascertained and taken into account in projection 6, it being possible to ascertain the depth information in particular for at least one subarea into which projection 6 takes place or from which projection 6 takes place.

After the projection, a consistency check may be carried out pixelwise or regionwise. If inconsistencies are recognized, they may be manually or automatically checked, in particular to classify them as false positive, false negative, or concealment (cf. FIGS. 4 and 5).

Depending on the result of this check, (either) the origin region or the destination region may be adapted, in particular correctly annotated. The image data and annotation data thus obtained may be used for a renewed training of the trainable method, for example of the neural network or classifier.

As an example, a consistency check of the object regions or labels takes place in block 202. This represents an example of, and optionally how, checking at least one subarea of at least one of detections 4, 5 and/or of at least one of the content representations for possible inconsistencies in the detection content may take place.

As an example, an extraction of inconsistent regions takes place in block 203. This represents an example of how an extraction of, and optionally how, at least one subarea of at least one of detections 4, 5 and/or of one of the content representations may take place in a step e) when an inconsistency in the detection content has been recognized in the subarea.

As an example, an automatic or manual check of the inconsistencies takes place in block 204. This represents an example of how a check of at least one subarea of at least one of detections 4, 5 and/or of one of the content representations may take place in a step e) or a step f) when an inconsistency in the detection content has been recognized in the subarea.

Figure 5:
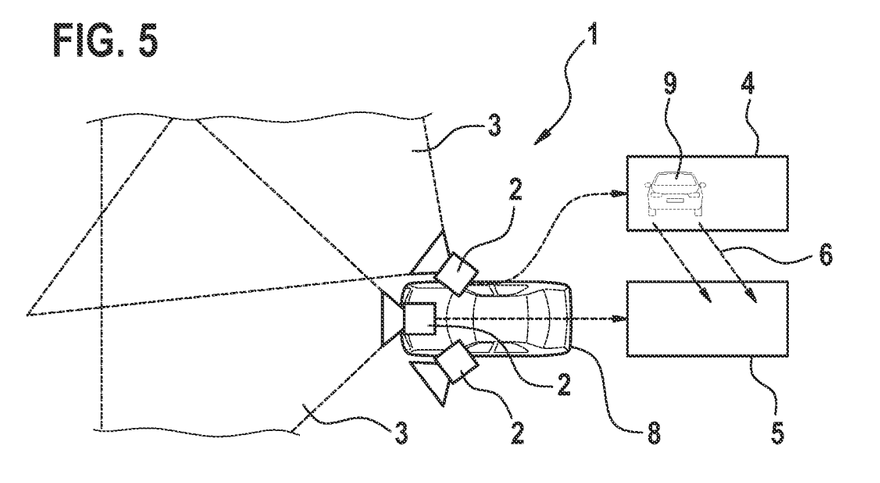
FIG. 5 schematically shows an example of a further possible application of the method, using a system described herein, according to the present invention.

A particularly advantageous aspect of the method may be regarded as detecting inconsistencies. A recognized inconsistency may have various causes. Examples of such causes are illustrated in following blocks 205, 206, and 207:

block 205: false negative recognition: an actually existing object has been recognized in one perspective but not in another perspective (cf. FIG. 4).

block 206: false positive recognition: an object has been erroneously recognized in one (or multiple) perspectives, although no object is present (cf. FIG. 5).

block 207: concealment: an object is visible from only one perspective, and is concealed from another perspective.

In addition, adapting at least one subarea of at least one of detections 4, 5 and/or of one of the content representations may take place, for example, in a step e) or a step f) or a step g) when an inconsistency in the detection content has been recognized in the subarea.

Examples of adaptations that may be made as a result of the causes stated above are illustrated in the following blocks 208, 209, and 210:

block 208: origin region is correctly annotated block 209: destination region is correctly annotated block 210: no action As an example, a training of the learning method takes place in block 211. The training may particularly advantageously take place based on training data that are generated or enhanced according to the method described herein.

FIG. 4 schematically shows an example of one possible application of the method using a system 1 described herein, including multiple (camera) sensors 2. In this context, FIG. 4 schematically shows an example of a case of a "false negative" recognition: An oncoming vehicle, as an example of an object 9, is recognized by one camera 2, but not by the other camera. New label data may be obtained by projection 6 into second camera image 5.

FIG. 5 schematically shows an example of a further possible application of the method using a system 1 described herein, including multiple (camera) sensors 2. In this context, FIG. 5 schematically shows an example of a case of a "false positive" recognition: A vehicle 9 that is not present is recognized by one camera 2, but is correctly not recognized by the other camera. Since object 9 is not present in second image 5, the data from first image 4 may be used as new training data in order to prevent misclassifications to the greatest extent possible.

Figure 6:
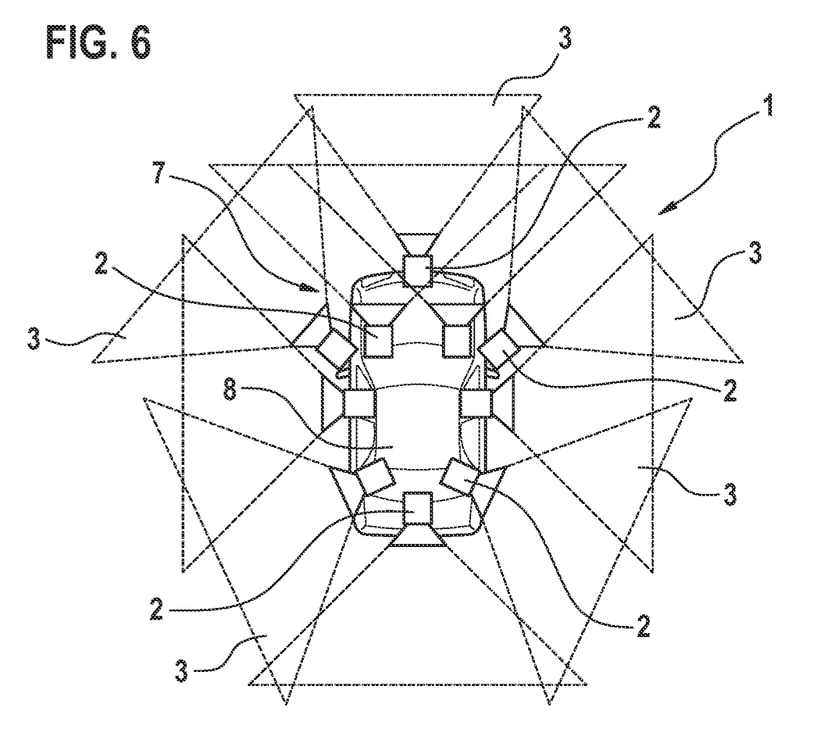
FIG. 6 schematically shows an example of one advantageous specific embodiment of the system described herein, including multiple sensors, according to the present invention.

FIG. 6 schematically shows an example of one advantageous specific embodiment of system 1 described herein, including multiple sensors 2. System 1 is provided and configured for carrying out the method described herein.

FIG. 6 schematically shows an example of one particularly advantageous embodiment of system 1 as a camera belt 7. Camera belt 7 is characterized in particular in that the surroundings of a vehicle 8 are or may be monitored by multiple cameras 2 with an overlapping visual range.

This represents an example of, and optionally how, system 1 may include multiple camera sensors 2 that are arranged in the form of a camera belt 7; system 1 in particular is suitable for use in or at a vehicle 8, and/or camera belt 7 may be situated in or at a vehicle 8.

In one particularly advantageous embodiment variant, a camera belt 7 may be used to carry out the method. The surroundings of a vehicle 8 may be observed all around by cameras 2.

A camera belt 7 is generally made up of a plurality of cameras 2 that fully cover the surroundings of vehicle 8 (360°), and whose visual ranges in each case include an overlap area.

FIG. 6 shows an example of how such a system 1 could look. The plurality of overlapping visual ranges, which are particularly suitable for the presented method, are apparent.

In most directions of the panoramic view, the same area of the setting is covered by at least two cameras or camera sensors 2. A consistency check of the labels may thus advantageously take place at many locations at the same time. In actual systems 1, it is also possible to install even a much greater number of cameras 2, so that regions may also be covered by three or more cameras, which may contribute to a particularly advantageous use of the method.

The method may be carried out particularly advantageously in this embodiment variant, since camera sensors 2 may have a virtually complete overlap area. The redundant image information may be utilized by the method in a particularly advantageous manner. By use of the method, a particularly great advantage may result for the consistency check of labels and the resulting availability of new training data.

FIG. 7 schematically shows an example of a further possible application of the method, using a system 1 described herein. In this context, FIG. 7 schematically shows an example of an oncoming vehicle 9 being recognized as it is approached by ego-vehicle 8. By use of the information concerning the temporal trajectory of ego-vehicle 8, recognized object 9 may be projected into a camera image 5 from the past, and the data thus obtained may be utilized as labels for training purposes.

This represents an advantageous example of, and optionally how, a temporal consistency check may be carried out in a further embodiment variant. This represents a particularly advantageous option when the method is to be utilized, for example, with a smaller number of camera sensors 2. When a camera 2 moves through the world, the same setting is recorded from various perspectives, which may result in an arrangement similar to that in the above-described embodiment variants. This procedure may generally expand the usability of the method to a much larger number of vehicles 8 or camera systems 1 (cf. FIG. 7).

Use may be made of the fact that the trajectory of ego-vehicle 8 is frequently known or may be ascertained. The trajectory may be determined, for example, by visual odometry, simultaneous localization and mapping (SLAM), vehicle odometry, or similar methods.

Depth information for the labels to be projected may be advantageous in this embodiment variant as well. Since at least two recordings of the same object are generally carried out in a monocamera system in order to determine the 3D position (and thus the depth) of the object, at least one further recording is advantageous for a subsequent projection of the object.

One particularly advantageous embodiment variant of the method may utilize three images following one another in chronological succession in order to carry out a temporal consistency check.

In this way, it may advantageously be made possible, also using only one camera 2, to make a projection of objects 9 or labels from one image 4 into another image 5, for example into an image 5 from the past (cf. FIG. 7). By use of this embodiment variant, the costs for material and systems 1 may advantageously be reduced, and use in vehicles 8 or similar structures at a lower price segment is also advantageously possible.

This represents an example of, and optionally how, a temporal consistency check may be carried out, for which purpose preferably at least three detections 4, 5 following one another in chronological succession may be used.

The preceding descriptions focus on use in photooptical systems, i.e., cameras. However, in the illustrated form the method is also usable for any type of (surroundings) sensor 2, for example LIDAR, radar, ultrasound, infrared cameras, microphones, or other electromagnetic sensors. Use of the method is advantageously possible in particular when, with the aid of a sensor 2 or sensor system, the position of an object 9 in space may be determined and/or an object 9 may be projected via the orientation of sensors 2 relative to one another.

Use across multiple sensors may also be advantageously achieved, for example by projecting radar, LIDAR, or ultrasound objects into camera images, or vice versa.

A part of the method may also be in particular automatic transfer of obtained label data to a central memory device on which the data may be further processed. One example could be the extraction of label data in private vehicles, the label data then being transferred to a data memory via a radio link. After the processing of the data and a renewed training of the trainable or learning method, updating of the software in ego-vehicle 8 may take place.

One particular advantage of the method may be regarded as the reduction of manual effort in the creation of label data for learning methods (deep learning, training of classifiers). New data for false positive or false negative cases may advantageously be quickly obtained by use of the consistency check. Cost savings may thus be achieved.

A corresponding, in particular automatic, generation of label data is advantageous in particular when the obtained label seldom occurs in the real world, for example for wild animals on or near the roadway, or for uncommon vehicles or traffic signs.

Use in virtually any vehicle or other type of camera system (robots, aircraft, etc.) is possible due to the advantageously good scalability of the system between a camera and an arbitrarily large number of cameras.

What is claimed is:

1. A method for generating training data for a trainable method for a system which includes one or multiple sensors for detecting at least one subarea of the surroundings around the system, the method comprising the following steps:
    a) obtaining one first detection and at least one second detection having at least one known relative ratio between the first and second detections and/or the sensors that have carried out the first and second detections;
    b) determining at least a portion of content of each of the first and second detections, and assigning at least one piece of information concerning the determined content to each of the the first and second detections;

c) projecting the at least one assigned piece of information from one of the first and second detections and/or from a content representation associated with one of the first and second detections into at least one other of the first and second detections and/or into a content representation associated with the at least one other of the first and second detections;

d) checking at least one subarea of at least one of the first and second detections and/or of at least one of the content representations for possible inconsistencies in the determined content of the first and second detections.

2. The method as recited in claim 1, wherein an extraction of at least one subarea of at least one of the first and second detections and/or of one of the content representations of the first and second detections, takes place when an inconsistency in the determined content has been recognized in the subarea.

3. The method as recited in claim 1, wherein the checking of the at least one subarea of at least one of the first and second detections and/or of one of the content representations of the first and second detections takes place when an inconsistency in the determined content of the first and second detections has been recognized in the subarea.

4. The method as recited in claim 1, wherein an adaptation of at least one subarea of at least one of the first and second detections and/or of one of the content representations of the first and second detections takes place when an inconsistency in the determined content of the first and second detections has been recognized in the subarea.

5. The method as recited in claim 1, wherein at least one piece of depth information concerning a spatial depth of at least one subarea of at least one of the first and second detections and/or of at least one of the content representations of the first and second detections is ascertained and taken into account in the projection.

6. The method as recited in claim 1, wherein the system includes multiple camera sensors that are arranged in the form of a camera belt.

7. The method as recited in claim 1, wherein a temporal consistency check is carried out.

8. A non-transitory machine-readable memory medium on which is stored a computer program for generating training data for a trainable method for a system which includes one or multiple sensors for detecting at least one subarea of the surroundings around the system, the computer program, when executed by a computer, causing the computer to perform the following steps:

a) obtaining one first detection and at least one second detection having at least one known relative ratio between the first and second detections and/or the sensors that have carried out the first and second detections;

b) determining at least a portion of content of each of the first and second detections, and assigning at least one piece of information concerning the determined content to each of the the first and second detections;

c) projecting the at least one assigned piece of information from one of the first and second detections and/or from a content representation associated with one of the first and second detections into at least one other of the first and second detections and/or into a content representation associated with the at least one other of the first and second detections;

d) checking at least one subarea of at least one of the first and second detections and/or of at least one of the content representations for possible inconsistencies in the determined content of the first and second detections.

9. A system, comprising:

one or multiple sensors;

wherein the system is configured to generate training data for a trainable method for a system which includes one or multiple sensors for detecting at least one subarea of the surroundings around the system, the system configured to:

a) obtain one first detection and at least one second detection having at least one known relative ratio between the first and second detections and/or the sensors that have carried out the first and second detections, b) determine at least a portion of content of each of the first and second detections, and assigning at least one piece of information concerning the determined content to each of the the first and second detections, c) project the at least one assigned piece of information from one of the first and second detections and/or from a content representation associated with one of the first and second detections into at least one other of the first and second detections and/or into a content representation associated with the at least one other of the first and second detections, d) check at least one subarea of at least one of the first and second detections and/or of at least one of the content representations for possible inconsistencies in the determined content of the first and second detections.

* * * * *